(12) United States Patent
Bergman (10) Patent No.: US 12,154,418 B2
(45) Date of Patent: Nov. 26, 2024

(54) SYSTEMS AND METHODS FOR REPEAT OFFENDER ANTI-THEFT NOTIFICATION

(71) Applicant: Sensormatic Electronics, LLC, Boca Raton, FL (US)

(72) Inventor: Adam S. Bergman, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 278 days.

(21) Appl. No.: 16/795,202

(22) Filed: Feb. 19, 2020

(65) Prior Publication Data

US 2021/0097832 A1    Apr. 1, 2021

Related U.S. Application Data

(60) Provisional application No. 62/908,323, filed on Sep. 30, 2019.

(51) Int. Cl.
| | |
|---|---|
| G08B 13/196 | (2006.01) |
| G06V 10/80 | (2022.01) |
| G06V 20/52 | (2022.01) |
| G06V 40/16 | (2022.01) |
| G08B 13/24 | (2006.01) |

(52) U.S. Cl.
CPC ...... *G08B 13/19613* (2013.01); *G06V 10/811* (2022.01); *G06V 20/52* (2022.01); *G06V 40/168* (2022.01); *G06V 40/172* (2022.01); *G08B 13/19684* (2013.01); *G08B 13/248* (2013.01)

(58) Field of Classification Search
CPC .............. G08B 13/19684; G08B 13/248
USPC ........................................ 340/539.13
See application file for complete search history.

(56) References Cited

U.S. PATENT DOCUMENTS

| | | | |
|---|---|---|---|
| 9,454,678 B2* | 9/2016 | Berger | H04W 12/126 |
| 2007/0182818 A1* | 8/2007 | Buehler | G08B 13/19641 |
| | | | 348/143 |
| 2012/0307051 A1* | 12/2012 | Welter | G08B 13/2482 |
| | | | 340/572.1 |
| 2012/0321146 A1* | 12/2012 | Kundu | G06Q 20/208 |
| | | | 340/568.8 |
| 2014/0254890 A1* | 9/2014 | Bergman | G06V 40/161 |
| | | | 382/118 |
| 2015/0287306 A1* | 10/2015 | Hallett | G08B 13/2482 |
| | | | 340/572.1 |
| 2015/0341599 A1 | 11/2015 | Carey | |
| 2015/0350914 A1* | 12/2015 | Baxley | H04W 72/20 |
| | | | 726/11 |
| 2016/0093182 A1* | 3/2016 | Turgeon | G08B 13/2402 |
| | | | 340/572.1 |

(Continued)

OTHER PUBLICATIONS

International Search Report and Written Opinion for PCT/US2020/053116 issued Jan. 14, 2021.

*Primary Examiner* — Jack K Wang
(74) *Attorney, Agent, or Firm* — ArentFox Schiff LLP (57) ABSTRACT

Systems and methods are disclosed for identifying a person of interest exiting or entering an establishment. In an example, the system may derive a confidence factor that for an individual exiting an establishment based on image recognition and device identification technologies when the individual when a security event, such as an alarm, is set off. The system may also identify an individual entering an establishment as a person of interest based on the confidence score by using the same technologies.

20 Claims, 6 Drawing Sheets

(56) References Cited

U.S. PATENT DOCUMENTS

| | | | |
|---|---|---|---|
| 2016/0127931 A1* | 5/2016 | Baxley | G06T 7/60 |
| | | | 455/67.16 |
| 2017/0256148 A1 | 9/2017 | King et al. | |
| 2019/0027004 A1* | 1/2019 | Yang | G06F 18/256 |
| 2019/0088096 A1* | 3/2019 | King | G08B 13/19665 |
| 2019/0130202 A1 | 5/2019 | Doumbouysa | |
| 2020/0027135 A1* | 1/2020 | Fernandez | G06Q 30/0271 |
| 2020/0057885 A1* | 2/2020 | Rao | G06V 40/172 |
| 2020/0348385 A1* | 11/2020 | Schindler | G01S 7/4817 |

* cited by examiner

SYSTEMS AND METHODS FOR REPEAT OFFENDER ANTI-THEFT NOTIFICATION

CROSS-REFERENCE TO RELATED APPLICATION

This application claims the benefit of U.S. Provisional Application Ser. No. 62/908,323, entitled "SYSTEMS AND METHODS FOR REPEAT OFFENDER ANTI-THEFT NOTIFICATION" and filed on Sep. 30, 2019, which is expressly incorporated by reference herein in its entirety.

BACKGROUND

The present disclosure relates generally to security systems, and more particularly, to systems and methods for repeat offender anti-theft notification.

Typical electronic article surveillance (EAS) systems initiate an EAS alarm when an individual that is shoplifting leaves a retail store with a unpurchased product. In some cases, however, a retailer may instruct a store clerk to not pursue the individual, for example, due to safety issues. In any case, an alarm triggered upon leaving a store may not be sufficient notice for the store clerks and/or the retailers to deal with the problem.

Accordingly, improvements in EAS systems are desired.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a security system for repeat offender anti-theft notification is disclosed. In an example, the security system includes a camera, a wireless device identification determiner, a memory storing instructions, and a processor in communication with the camera, the wireless device identification determiner, and the memory. The processor may be configured to determine a security event has occurred. The processor may also be configured to obtain, from the camera, an image corresponding to the security event. The processor may also be configured to generate a first score corresponding to a person of interest based on whether an individual is detected in the image. The processor may also be configured to cause the wireless device identification determiner to search for a device identification of a wireless device corresponding to the security event. The processor may also be configured to generate a second score corresponding to the person of interest based on whether the device identification is identified. The processor may also be configured to generate a confidence score corresponding to the person of interest based on the first score and the second score. The processor may also be configured to store the confidence score in correlation with person of interest information in a database.

In another aspect, a security system for repeat offender anti-theft notification is disclosed. In an example, the security system includes a camera, a wireless device identification determiner, a memory storing instructions, and a processor in communication with the camera, the wireless device identification determiner, and the memory. The processor may be configured to obtain, from the camera, an image corresponding to an entrance of an individual. The processor may also be configured to cause the wireless device identification determiner to search for a device identification of a wireless device corresponding to the entrance of the individual. The processor may also be configured to determine whether the individual is a person of interest based on one or more of the image or the device identification. The processor may also be configured to determine a confidence score corresponding to the person of interest in response to determining the individual is the person of interest. The processor may also be configured to transmit a notification of the person of interest to a device in response to the confidence score exceeding a confidence threshold.

In an aspect, a method of identifying a person of interest by a security system is disclosed. The method may include determining a security event has occurred. The method may also include obtaining, from a camera, an image corresponding to the security event. The method may also include generating a first score corresponding to a person of interest based on whether an individual is detected in the image. The method may also include causing a wireless device identification determiner to search for a devices identification of a wireless device corresponding to the security event. The method may also include generating a second score corresponding to the person of interest based on whether the device identification is identified. The method may also include generating a confidence score corresponding to the person of interest based on the first score and the second score. The method may also include storing the confidence score in correlation with person of interest information in a database.

In another aspect, a method of identifying a person of interest by a security system is disclosed. The method may include obtaining, from a camera, an image corresponding to an entrance of an individual. The method may also include causing a wireless device identification determiner to search for a device identification of a wireless device corresponding to the entrance of the individual. The method may also include determining whether the individual is a person of interest based on one or more of the image or the device identification. The method may also include determining a confidence score corresponding to the person of interest in response to determining the individual is the person of interest. The method may also include transmitting a notification of the person of interest to a device in response to the confidence score exceeding a confidence threshold.

In an aspect, a computer-readable medium storing computer executable instructions for identifying a person of interest by a security system is disclosed. The computer-readable medium may include instructions to determine a security event has occurred. The computer-readable medium may also include instructions to obtain, from a camera, an image corresponding to the security event. The computer-readable medium may also include instructions to generate a first score corresponding to a person of interest based on whether an individual is detected in the image. The computer-readable medium may also include instructions to cause a wireless device identification determiner to search for a device identification of a wireless device corresponding to the security event. The computer-readable medium may also include instructions to generate a second score corresponding to the person of interest based on whether the device identification is identified. The computer-readable medium may also include instructions to generate a confidence score corresponding to the person of interest based on the first score and the second score. The computer-readable medium may also include instructions to store the confidence score in correlation with person of interest information in a database.

In another aspect, a computer-readable medium storing computer executable instructions for identifying a person of interest by a security system is disclosed. The computer-readable medium may include instructions to obtain, from a camera, an image corresponding to an entrance of an individual. The computer-readable medium may also include instructions to cause a wireless device identification determiner to search for a device identification of a wireless device corresponding to the entrance of the individual. The computer-readable medium may also include instructions to determine whether the individual is a person of interest based on one or more of the image or the device identification. The computer-readable medium may also include instructions to determine a confidence score corresponding to the person of interest in response to determining the individual is the person of interest. The computer-readable medium may also include instructions to transmit a notification of the person of interest to a device in response to the confidence score exceeding a confidence threshold.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

In many retail stores, there is a need of identifying persons of interest (POI) in the context of theft incidents. Typical electronic article surveillance (EAS) systems merely provide an alarm to notify store clerks of an individual leaving a store without paying for a product. This means the individual has already performed the theft and may escape without being caught by law enforcement officials.

The present disclosure addresses one or more shortcomings of a typical EAS system by providing systems and methods for repeat offender anti-theft notification at a retail store. In an example, a system implemented according to the present disclosure may build an index of confidence scores and POIs based on both facial recognition and wireless (e.g., WiFi or Bluetooth) identifying technologies operating simultaneously. The system may derive a confidence score for an individual based on these technologies. Further, the system may identify an individual as a POI (e.g., potential shoplifting suspect) as the individual enters the store (i.e., before the individual has shoplifted). In other words, the system may identify the individual as a POI based on a confidence score generated from past actions by the individual.

The systems and methods described herein may offer a pro-active opportunity to stop potential theft "before" it happens. The incremental benefit of this solution is that the confidence in a notification according to the present disclosure may be higher than those of a typical EAS system due to a linking of a facial image with a wireless device identification.

Turning now to the figures, example aspects are depicted with reference to one or more components described herein, where components in dashed lines may be optional.

Figure 1:
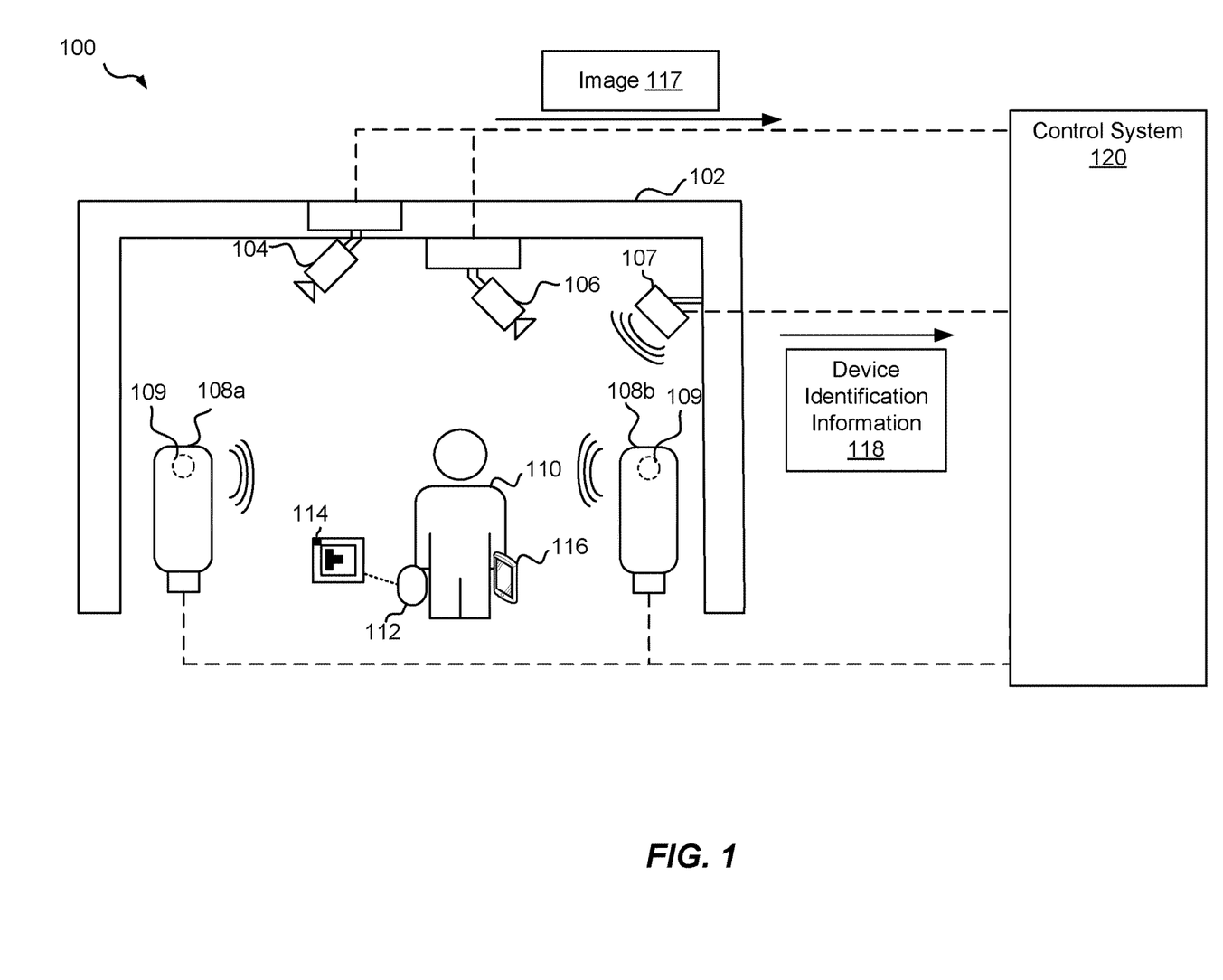
FIG. 1 is a block diagram of an example security system, according to implementations of the present disclosure.

Referring to FIG. 1, an example security system 100 deployed at an establishment (e.g., store) 102 is depicted. The security system 100 may include, for example, one or more outside-facing cameras 104 facing out from an entrance of the establishment 102 and one or more inside-facing cameras 106 facing inward from the entrance of the establishment 102. The cameras 104, 106 may capture an image 117 (e.g., video image or photographic image) of individuals (e.g., individual 110) entering and/or exiting the establishment 102. The security system 100 may also include, for example, one or more wireless device identification determiners 107 which attempt to identify a wireless device (e.g., wireless device 116 associated with individual 110) entering and/or exiting the establishment 102 and collect a corresponding device identification information 118. Examples of a wireless device identification determiner 107 may include a network sniffer, packet sniffer, packet analyzer, or any other device capable of capturing a device identification from a wireless device. The present implementations provide mechanisms to generate confidence scores of persons of interest (POIs), which include individuals believed to have engaged in theft of items (e.g., item 112) from the establishment 102 or another establishment, or at least associated with one or more previous security events, based on a combination of the image 117 and corresponding device identification information 118. Correspondingly, the present implementations provide mechanisms to alert security personal of the entrance of an identified person of interest into the establishment 102.

Exiting the Establishment

In an example, an individual 110 may exit the establishment 102 by passing through one or more pedestal scanners 108a and 108b. When the individual 110 purchases an item 112, an electronic tag 114 (e.g., a radio frequency identifier (RFID) tag, an acousto-magnetic tag, or any other type of EAS device) on the item 112 may be removed or deactivated so that it will not be detected by the scanners 108a and 108b.

In some instances, the individual 110 may steal or not purchase the item 112, therefore the electronic tag 114 is not deactivated or removed. In this case, when the individual 110 exits from the establishment 102, the pedestal scanners 108a and 108b may detect that the item 112 with the electronic tag 114 is located near the scanners, and that the item 112 is being carried out of the establishment 102 without having been purchased by the individual 110. As such, the pedestal scanners 108a and 108b and/or the control system 120 may activate one or more notification devices 109, such as an audio alarm device, a strobe or flashing light device, and/or a notification message sent to security or store personnel to notify the personnel about the security event or potential theft.

Concurrently, as the individual 110 is just prior to exiting the establishment 102, or as they are exiting, or after they have exited, the inside-facing camera 106 and/or the outside-facing camera 104 may capture an image 117 (e.g., via recorded video or photographic image) of the individual 110 exiting the establishment 102 and send the image 117 to the control system 120 for processing, as described in further detail herein. Further, the wireless device identification determiner 107 may concurrently attempt to detect the wireless device 116. For example, the wireless device identification determiner 107 may attempt to detect a device identification (e.g., media access control (MAC) address, an Internet Protocol address, or any other type of unique device identifier) of the wireless device 116 by scanning WiFi, Bluetooth, and/or any other wireless protocol. The wireless device identification determiner 107 may send device identification information 118, including device identification of the wireless device 116, to the control system 120 for processing, as described in further detail herein. Based on the images 117 and the device identification information 118, the control system 120 may generate a confidence score corresponding to the individual 110 and store the confidence score along with person of interest (POI) information (e.g., image of POI or device identification of wireless device corresponding to POI) for future detections, as described in more detail herein.

In an aspect, the confidence score along with the POI information may be shared with other establishments. Further, when a subsequent security event occurs (at the establishment 102 or another establishment) and a second image corresponding to the security event or a second device identification corresponding to the security event matches those of the POI information, the confidence score corresponding to the POI information may be updated based on the subsequent security event. For example, a subsequent confidence score corresponding to subsequent security event may be calculated, and when a feature set (e.g., facial features) of the second image or the second device identification match the POI information, the second confidence score may be added to the confidence score and stored as the confidence score corresponding to the POI. This multi-factor (e.g., image plus device identification) confidence score may ultimately be used to proactively notify store or security or law enforcement personnel of a potential POI upon the corresponding individual being detected as entering a store.

Figure 2:
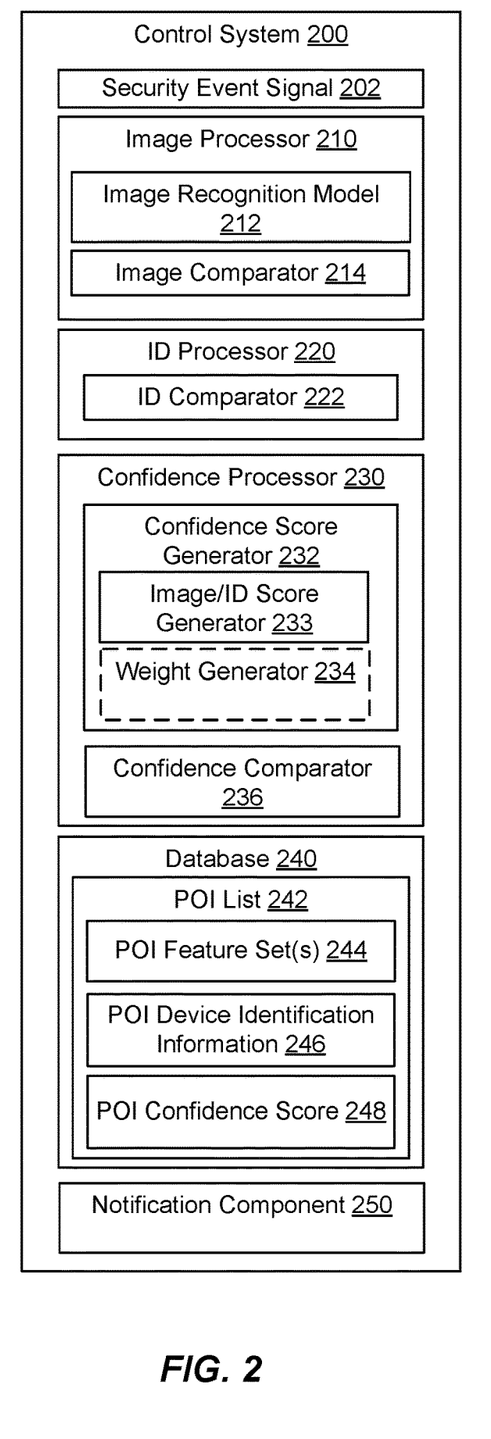
FIG. 2 is a block diagram of an example control system implemented by the security system of FIG. 1, according to implementations of the present disclosure.

Referring to FIG. 2, details of the control system 120 in relation to the individual 110 exiting the establishment 102 are depicted. In an example, the control system 120 may generate a security event signal 202 when the item 112 is being carried out of the establishment 102 without having been purchased by the individual 110. The security event signal 202 may signal to the pedestal scanners 108a and 108b to send an alert (e.g., via notification devices 109), to the inside-facing camera 106 and/or the outside-facing camera 104 to capture the image 117, and to the wireless device identification determiner 107 to detect the device identification of the wireless device 116.

The control system 120 may include an image processor 210 configured to process the image 117. In an example, the image processor 210 may obtain the image 117 from the cameras 104 and 106, in response to the security event signal 202. In an example, one or more of the images 117 may be captured from a timeframe that spans before and after the security event signal 202, e.g., within a certain threshold time.

The image processor 210 may also include an image recognition model 212 configured to identify a feature set (e.g., facial features) of the image 117 corresponding to the individual 110. In an example, the image recognition model 212 may include an image comparator 216 configured to compare the feature set of the image 117 with one or more POI feature sets 244 stored in a database 240.

The control system 120 may include an ID processor 220 configured to process the device identification information 118. In an example, the ID processor 220 may determine whether the device identification information 118 corresponds to the security event based on the captured time of the device identification information 118. In an example, the ID processor 220 may include an ID comparator 222 configured to compare the device identification information 118 to POI device identification information 246 stored in the database 240.

The control system 120 may include a confidence processor 230 configured to generate and/or update a confidence score corresponding to a POI. In an example, if the image comparator 214 or the ID comparator 222 determines a match, a confidence score corresponding to the POI may be updated. Otherwise, the POI is a new POI and a new confidence score is generated.

The confidence processor 230 may include an image/ID score generator configured to generate an image score (e.g., first score) and an ID score (e.g., second score) corresponding to the security event. In an example, if the image recognition model 212 identifies a feature set of the image 117, the image score may be scored at a predetermined value (e.g., 1), and if the image recognition model 212 does not identify a feature set of the image 117, the image score may be scored at second predetermined value (e.g., 0). Further, if the ID processor 220 obtains a device identification of the wireless device 116 from the device identification information 118, the ID score may be scored at a predetermined value (e.g., 1), and if the ID processor 220 does not obtain the device identification, the ID score may be scored at second predetermined value (e.g., 0).

In some examples, the confidence processor 230 may include a weight generator 234 which weights the image score and/or the ID score. In an example, the weight generator 234 may weight one of the image score or the ID score over the other. For example, the ID score may be weighted at a percentage (e.g., 50%) of the image score such that if both a feature set and a device identification are identified, the image score is, for example, 1 and the ID score is 0.5.

The confidence processor 232 may generate a confidence score based on the image score and the ID score. For example, the confidence score may be the sum of the image score and the ID score. However, other algorithms and calculations may be used, including those considering the weight of the image score and the ID score.

The confidence processor 232 may store the calculated confidence score in the database 240 as the POI confidence score 248. In an example, the POI list 242 may associate the POI confidence score 248 with the one or more of the POI feature sets 244 or the POI device identification information 246.

Entering the Establishment

In an example, the security system 100 may also alert personnel when a POI enters the establishment 102 based on the POI confidence score 248. In an example, the security system 100 may maintain a confidence threshold corresponding to the POI confidence score 248. When the individual 110 and/or the wireless device 116 enters the establishment 102, the security system 100 may determine that the individual 110 is a POI. For example, the inside-facing camera 106 and/or the outside-facing camera 104 may capture an image 117 (e.g., via recorded video or photographic image) of the individual 110 entering the establishment 102 and send the image 117 to the control system 120 for comparison to POI information, as described in further detail herein. Further, the wireless device identification determiner 107 may concurrently attempt to detect the wireless device 116 entering the establishment 102 by scanning WiFi, Bluetooth, and/or any other wireless protocol to determine a device identification (e.g., MAC address) of the wireless device 116. The wireless device identification determiner 107 may send the device identification information 118, including device identification of the wireless device 116, to the control system 120 for comparison to the POI information, as described in further detail herein. Based on the images 117 and the device identification information 118, the control system 120 may determine the individual is a POI when, for example, a features set of the image 117 or the device identification information 118 matches the POI information. In response to determining that the individual is a POI, the security system 100 may compare the confidence score corresponding to the POI with the confidence threshold. When the confidence score exceeds the confidence threshold, this means the POI (e.g., individual 110) has been involved in a sufficient number of security events that security personnel should be notified of the POI's presence in the establishment 102. When the confidence score does not exceed the confidence threshold, the may mean that the POI has not been involved in enough security events to warrant a notification to security personnel of the establishment 102.

Referring to FIG. 2, the control system 120 in relation to the individual 110 entering the establishment 102 are depicted. In an aspect, the image processor 210 may receive the image 117 corresponding to the individual 110 entering the establishment 102, and the image comparator 214 may compare a feature set of the image 117 to the POI feature sets 244 to determine whether the individual 110 is a POI. Further, the ID processor 220 may receive the device identification information 118, and the ID comparator 222 may compare any device identification to the POI device identification information 246 to determine whether the individual 110 is a POI. In other words, if one or more of the image comparator 214 or the ID comparator 222 determines a match, the individual 110 is determined to be a POI.

The confidence processor 230 further includes a confidence comparator 236 configured to determine whether to alert a security personnel based on the POI confidence score 248. For example, once the individual 110 is determined to be a POI, the confidence comparator 236 compares the POI confidence score 248 (e.g., 10) with a confidence threshold value (e.g., 9). When the POI confidence score 248 is greater than the confidence threshold value, this may indicate that the POI was involved in multiple security events at the establishment 102 and/or other establishments. Otherwise, when the POI confidence score 248 is not greater than the confidence threshold value, this may indicate that the POI was not involved in a sufficient number of security events to warrant the involvement of security personnel.

The control system 120 may include a notification component 250 configured to alert a security personnel regarding the POI confidence score 248 of the individual 110 exceeding the confidence threshold value. In an example, the notification component 250 may include a wired or wireless transceiver configured to transmit one or more notifications (e.g., email, text, alarm) to a device used by the security personnel.

Accordingly, the security system 100 may provide mechanisms to build a profile of a POI based on information obtained as the individual 110 exits the establishment 102 (or another establishment) and a proactive approach to identify the individual 110 when entering the establishment 102 (or another establishment) and to alert security personnel based on the POI information.

Figure 3:
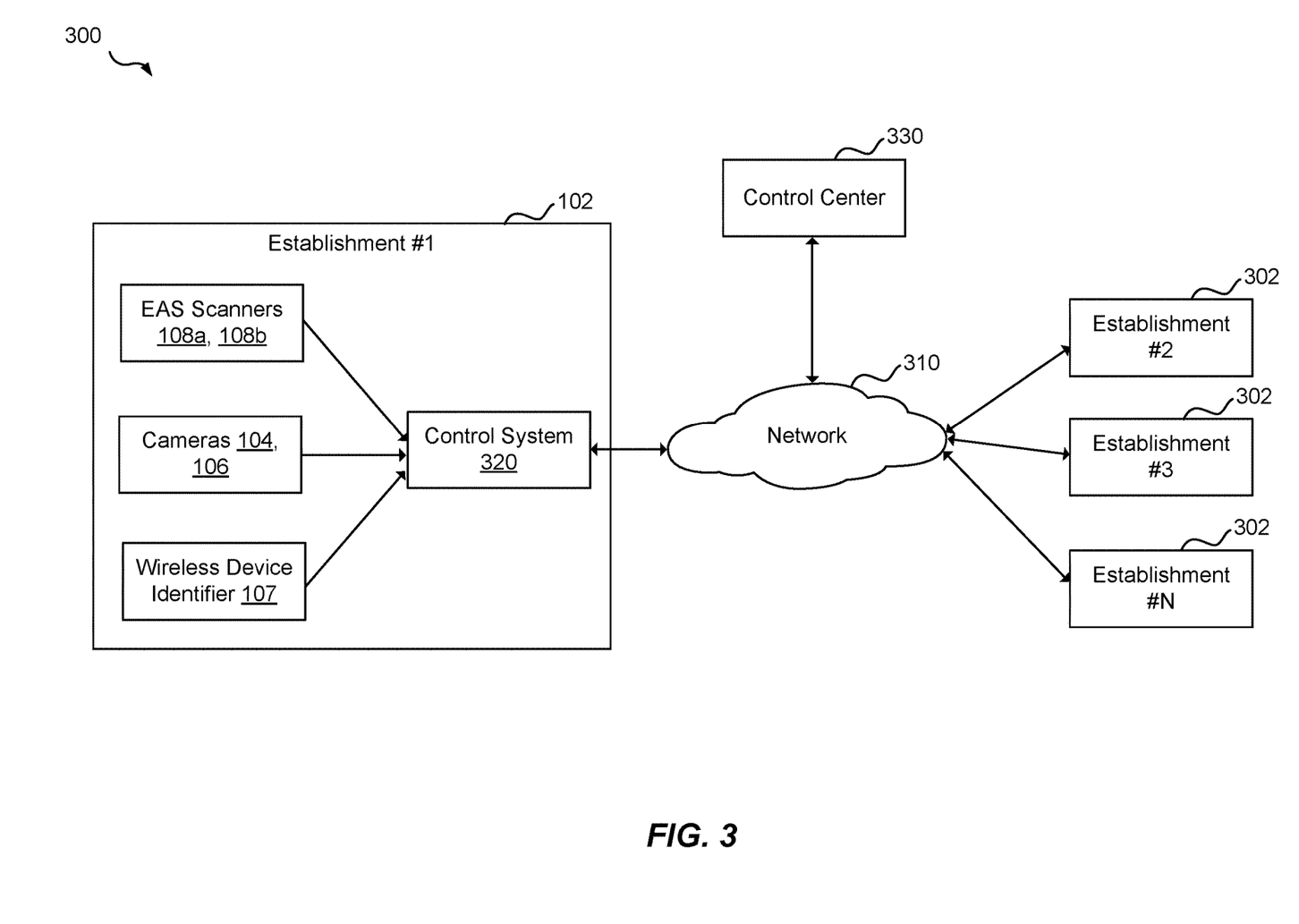
FIG. 3 is a block diagram of an example security system of FIG. 1 implemented with other security systems, according to implementations of the present disclosure.

Referring to FIG. 3, an example security system 300 configured for multiple establishments is depicted. In an example, the establishment 102 may be one of many establishments in the security system 300. For example, the establishment 102 may communicate with one or more additional establishments 302 via a network 310 to share POI information including images 117 and device identification information 118 for security purposes, as described herein. In some examples, the establishment 102 may include the control system 320, which performs all functions of the control system 120. In another example, the security system 300 may also include a control center 330 which, in conjunction with the control system 320, performs all functions of the control system 120.

Figure 4:
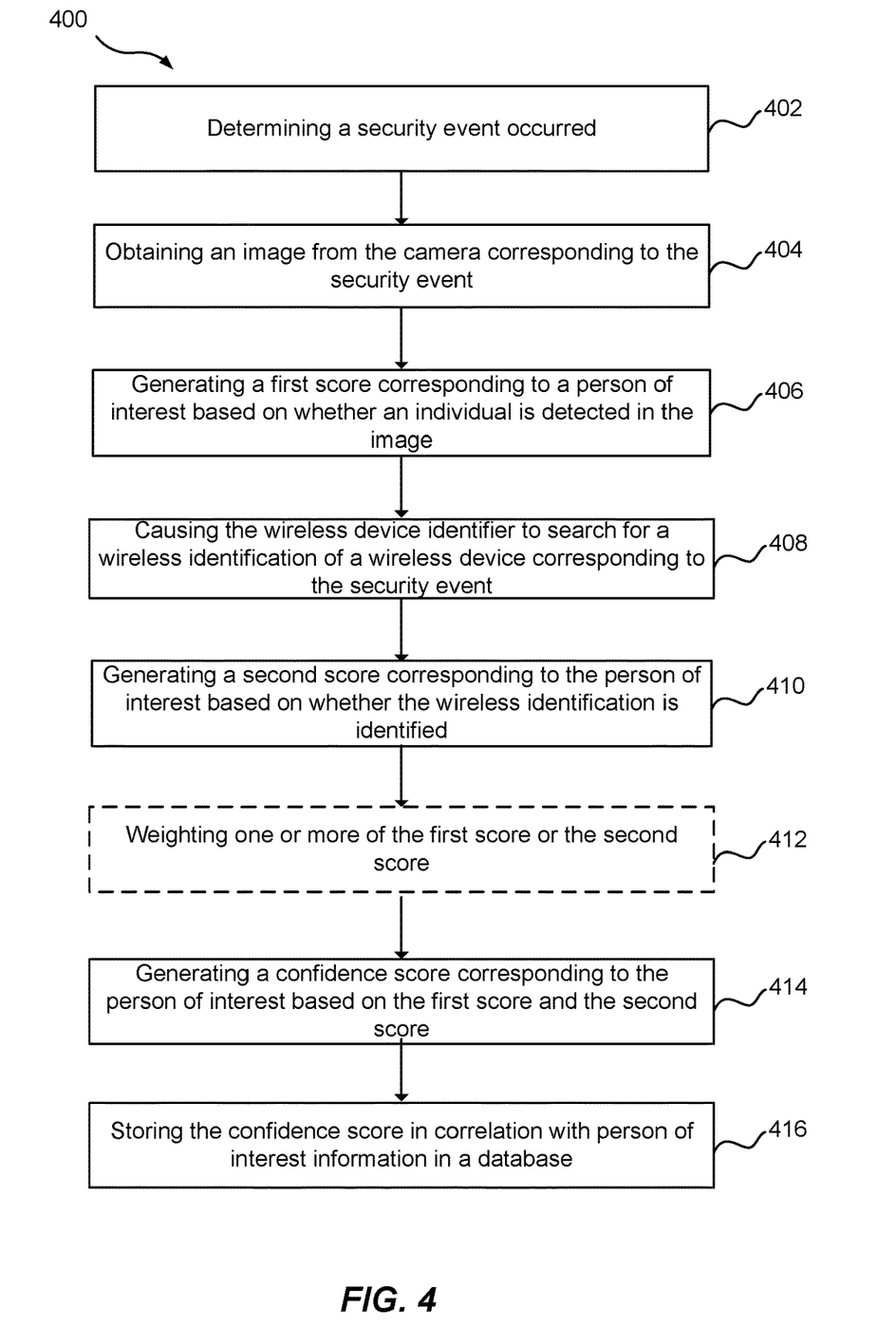
FIG. 4 is a flowchart of an example method implemented by the security system of FIG. 1, according to implementations of the present disclosure.

Referring to FIG. 4, an example method 400 of identifying a POI at an exit event by the security system 100 or 300 is depicted. The operations of the method 400 may be performed by one or more components of the security system 100 or 300, as described herein.

At 402, the method 400 may include determining a security event has occurred. For example, the control system 120, 200, or 310 (and/or the control center 320) may determine a security event has occurred based on receiving the security event signal 202 from the pedestal scanners 108a and 108b when the item 112 having the electronic tag 114 is located near the scanners.

At 404, the method 400 may also include obtaining, from a camera, an image corresponding to the security event. For example, one or more of the control system 120, 200, or 310 (and/or the control center 320), the image processor 210, or the image recognition model 212 may receive the image 117 (e.g., video image or photographic image) from the one or more of the cameras 104 or 106 corresponding to the security event signal 202 being received. In an example, one or more of the control system 120, 200, or 310 (and/or the control center 320), the image processor 210, or the image recognition model 212 may transmit instructions to the camera 104/106 to capture the image 117 in response to the security event. The one or more of the control system 120, 200, or 310 (and/or the control center 320), the image processor 210, or the image recognition model 212 may receive the image 117 in response to the transmitted instructions.

At 406, the method 400 may include generating a first score corresponding to a POI based on whether an individual is detected in the image. For example, one or more of the control system 120, 200, or 310 (and/or the control center 320), the confidence processor 230, the confidence score generator 232, or the image/ID score generator 233 may generate an image score (e.g., first score) corresponding to one or more of an individual 110 or a feature set of the individual 110 being detected in the image 117. In an example, when the individual 110 and/or a feature set of the individual 110 is identified in the image, the image score may have a value of 1, and when the not identified, the image score may have a value of 0.

At 408, the method 400 may include causing a wireless device identification determiner to search for a device identification of a wireless device corresponding to the security event. For example, one or more of the control system 120, 200, or 310 (and/or the control center 320) or the ID processor 220 may cause the wireless device identification determiner 107 to search for a device identification information 118 of the wireless device 116 corresponding to the security event. In an example, one or more of the control system 120, 200, or 310 (and/or the control center 320), the image processor 210, or the image recognition model 212 may transmit instructions to the wireless device identification determiner 107 to search for the device identification information 118 in response to the security event. The one or more of the control system 120, 200, or 310 (and/or the control center 320), the image processor 210, or the image recognition model 212 may receive the device identification information 118 in response to the transmitted instructions.

At 410, the method 400 may include generating a second score corresponding to the person of interest based on whether the device identification is identified. For example, one or more of the control system 120, 200, or 310 (and/or the control center 320), the confidence processor 230, the confidence score generator 232, or the image/ID score generator 233 may generate an ID score (e.g., second score) corresponding to the POI based on whether the device identification is identified. In an example, when the device identification is identified, the ID score may have a value of 1, and when the device identification is not identified, the ID score may have a value of 0.

At 412, the method 400 may optionally include weighting one or more of the first score or the second score. For example, one or more of the control system 120, 200, or 310 (and/or the control center 320), the confidence processor 230, the confidence score generator 232, the image/ID score generator 233, or the weight generator 234 may weight one or more of the image score or the ID score. In an example, the image score may be weighted higher than the ID score. For example, the ID score may be weighted at a percentage (e.g., 50%) of the image score.

At 414, the method 400 may include generating a confidence score corresponding to the POI based on the first score and the second score. For example, one or more of the control system 120, 200, or 310 (and/or the control center 320), the confidence processor 230, or the confidence score generator 232 may generate a confidence score corresponding to the POI based on the image score and the ID score. In an example, the confidence score may be generated by summing the image score and the ID score (with or without the weighting, depending on the example).

At 416, the method 400 may include storing the confidence score in correlation with POI information in a database. For example, one or more of the control system 120, 200, or 310 (and/or the control center 320), the confidence processor 230, or the confidence score generator 232 may store the confidence score as POI confidence score 248 and associate the confidence score with POI information such as POI feature sets 244 and/or POI device identification information 246 in the database 240.

Figure 5:
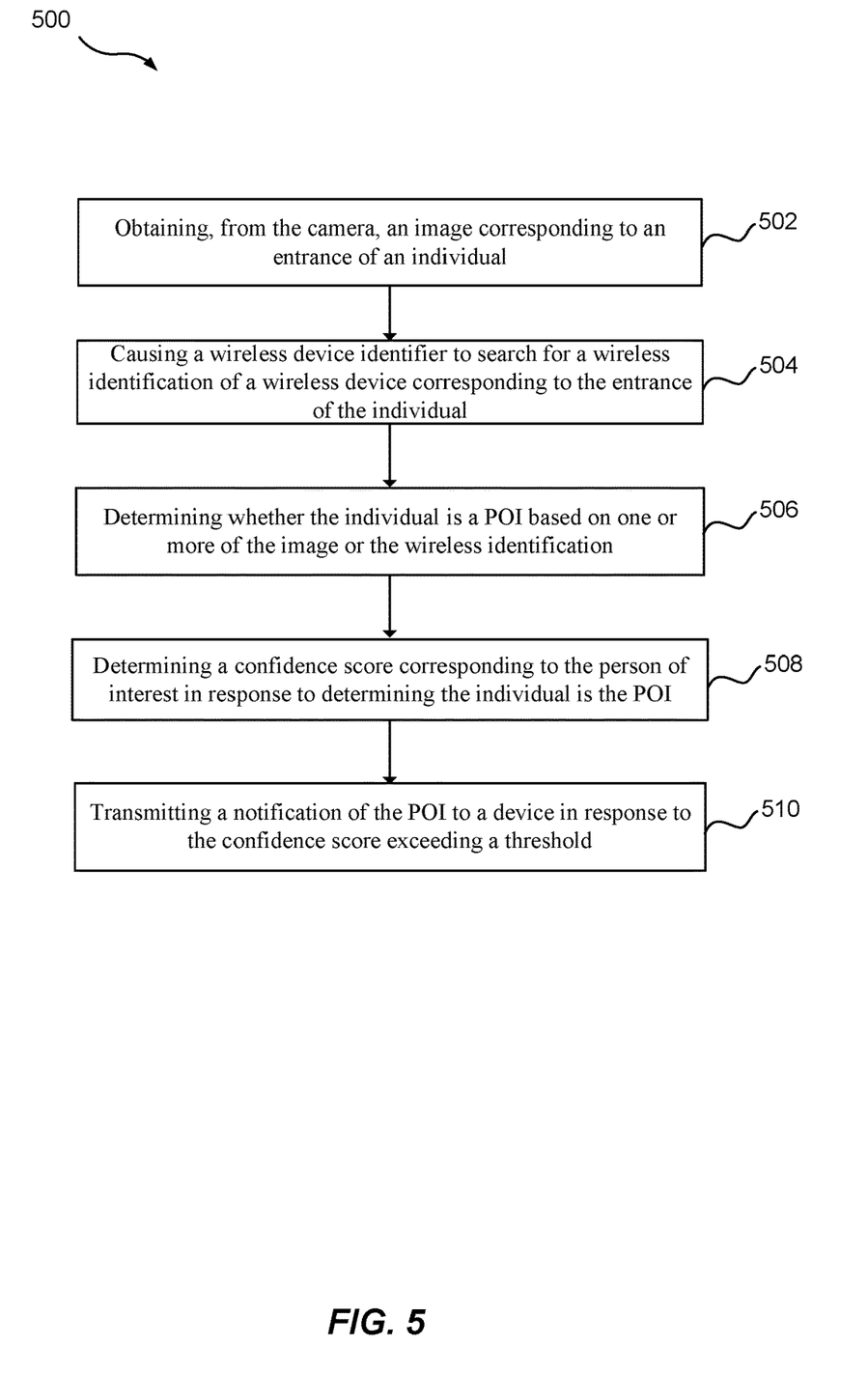
FIG. 5 is a flowchart of another example method implemented by the security system of FIG. 1, according to implementations of the present disclosure.

Referring to FIG. 5, an example method 500 of identifying a POI at an entrance event by the security system 100 or 300 is depicted. The operations of the method 500 may be performed by one or more components of the security system 100 or 300, as described herein.

At 502, the method 500 may include obtaining, from the camera, an image corresponding to an entrance of an individual. For example, one or more of the control system 120, 200, or 310 (and/or the control center 320), the image processor 210, or the image recognition model 212 may receive the image 117 (e.g., video image or photographic image) from the one or more of the cameras 104 or 106 corresponding to an entrance of the individual 110 at the establishment 102. In an example, one or more of the control system 120, 200, or 310 (and/or the control center 320), the image processor 210, or the image recognition model 212 may transmit instructions to the camera 104/106 to capture the image 117 in response to the entrance. The one or more of the control system 120, 200, or 310 (and/or the control center 320), the image processor 210, or the image recognition model 212 may receive the image 117 in response to the transmitted instructions.

At 504, the method 500 may include causing a wireless device identification determiner to search for a device identification of a wireless device corresponding to the entrance of the individual. For example, one or more of the control system 120, 200, or 310 (and/or the control center 320) or the ID processor 220 may cause the wireless device identification determiner 107 to search for a device identification of the wireless device 116 corresponding to the entrance of the individual 110 into the establishment 102. In an example, one or more of the control system 120, 200, or 310 (and/or the control center 320), the image processor 210, or the image recognition model 212 may transmit instructions to the wireless device identification determiner 107 to search for the device identification information 118 in response to the entrance. The one or more of the control system 120, 200, or 310 (and/or the control center 320), the image processor 210, or the image recognition model 212 may receive the device identification information 118 in response to the transmitted instructions.

At 506, the method 500 may include determining whether the individual is a POI based on one or more of the image or the device identification. For example, one or more of the control system 120, 200, or 310 (and/or the control center 320), the image processor 210, the image recognition model 212, the image comparator 214, the ID processor 220, or the ID comparator may determine whether the individual 110 is a POI. In an example, the individual 110 may be a POI based on a match between a feature set of the image 117 to one or more POI feature sets 244, and/or the individual 110 may be a POI based on a match between a device identification of the wireless device 116 and a POI device identification information 246.

At 508, the method 500 may include determining a confidence score corresponding to the person of interest in response to determining the individual is the person of interest. For example, one or more of the control system 120, 200, or 310 (and/or the control center 320), the confidence processor 230, or the confidence comparator 236 may determine a confidence score corresponding to the POI in response to determining the individual 110 is the POI. In an example, one or more of the control system 120, 200, or 310 (and/or the control center 320), the confidence processor 230, or the confidence comparator 236 may read the POI confidence score 248 associated with the POI information, including the POI feature set 244 and/or the POI device identification information 246, stored in the database 240 and/or the POI list 242.

At 510, the method 500 may include transmitting a notification of the POI to a device in response to the confidence score exceeding a confidence threshold. For example, one or more of the control system 120, 200, or 310 (and/or the control center 320) or the notification component 250 may transmit a notification such as an email, text, or alert to a device associated with security personnel when the confidence score exceeds a confidence threshold value. In an example, one or more of the control system 120, 200, or 310 (and/or the control center 320) or the confidence comparator 236 may compare the POI confidence score 248 associated with the POI to a confidence threshold value to determine whether to transmit the notification.

Figure 6:
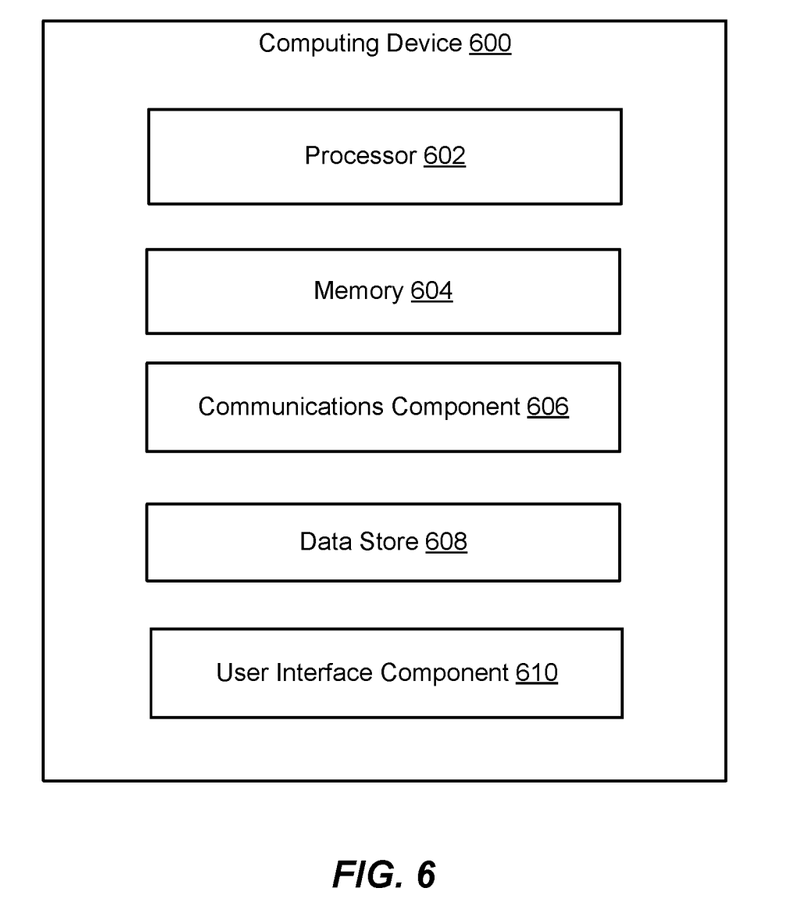
FIG. 6 is a block diagram of examples components of a computer device that may implement one or more of the features of the security system of FIG. 1.

Referring to FIG. 6, a computing device 600 may implement all or a portion of the functionality described in FIGS. 1-5. For example, the computing device 600 may be or may include at least a portion of the control system 120, 200, or 320, the control center 330, or any other component described herein with reference to FIGS. 1-5. The computing device 600 may include a processor 602 which may be configured to execute or implement software, hardware, and/or firmware modules that perform some or all of the functionality described herein with reference to FIGS. 1-5. For example, the processor 602 may be configured to execute or implement software, hardware, and/or firmware modules that perform some or all of the functionality described herein with reference to the control system 120, 200, or 320, the control center 330, or any other component described herein with reference to FIGS. 1-5.

The processor 602 may be a micro-controller, an application-specific integrated circuit (ASIC), or a field-programmable gate array (FPGA), and/or may include a single or multiple set of processors or multi-core processors. Moreover, the processor 602 may be implemented as an integrated processing system and/or a distributed processing system. The computing device 300 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, etc., and/or other components of the computing device 300.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A security system, comprising:
a camera;
a wireless device identification determiner;

a memory storing instructions; and
a processor in communication with the camera, the wireless device identification determiner, and the memory and configured to execute the instructions to:
  determine a security event has occurred;
  obtain, from the camera, an image corresponding to the security event;
  generate a first score corresponding to a person of interest based on whether an individual is detected in the image;
  obtain, from the wireless device identification determiner, a device identification of a wireless device, other than a radio frequency identification (RFID) tag, associated with the person of interest and corresponding to the security event;
  generate a second score corresponding to the person of interest based on the obtained device identification;
  generate a confidence score corresponding to the person of interest based on the first score and the second score; and
  store the confidence score in correlation with person of interest information in a database.

2. The security system of claim 1, wherein the processor is further configured to execute the instructions to:
  weight the first score or the second score according to a weighted score.

3. The security system of claim 1, wherein the individual is detected in the image based on facial recognition.

4. The security system of claim 1, wherein the person of interest information includes one or more of the image or the device identification of the person of interest.

5. A security system, comprising:
a camera;
a wireless device identification determiner;
a memory storing instructions; and
a processor in communication with the camera, the wireless device identification determiner, and the memory and configured to execute the instructions to:
  obtain, from the camera, an image corresponding to an entrance of an individual;
  obtain, from the wireless device identification determiner, a device identification of a wireless device, other than a radio frequency identification (RFID) tag, associated with the individual and corresponding to the entrance;
  determine whether the individual is a person of interest based on one or more of the image or the device identification;
  determine a confidence score corresponding to the person of interest in response to determining the individual is the person of interest; and
  transmit a notification of the person of interest to a device in response to the confidence score exceeding a confidence threshold.

6. The security system of claim 5, wherein the individual is determined to be the person of interest in response to one or more features of the image corresponding to a person of interest feature set or the device identification corresponding to a person of interest identification set.

7. The security system of claim 5, wherein the confidence score is a weighted score corresponding to previous security events.

8. A method of identifying a person of interest by a security system, comprising:
  determining a security event has occurred;
  obtaining, from a camera, an image corresponding to the security event;
  generating a first score corresponding to a person of interest based on whether an individual is detected in the image;
  obtaining, from a wireless device identification determiner, a device identification of a wireless device, other than a radio frequency identification (RFID) tag, associated with the person of interest and corresponding to the security event;
  generating a second score corresponding to the person of interest based on the obtained device identification;
  generating a confidence score corresponding to the person of interest based on the first score and the second score; and
  storing the confidence score in correlation with person of interest information in a database.

9. The method of claim 8, further comprising:
  weighting the first score or the second score according to a weighted score.

10. The method of claim 8, wherein the individual is detected in the image based on facial recognition.

11. The method of claim 8, wherein the person of interest information includes one or more of the image or the device identification of the person of interest.

12. A method of identifying a person of interest by a security system, comprising:
  obtaining, from a camera, an image corresponding to an entrance of an individual;
  obtaining, from a wireless device identification determiner, a device identification of a wireless device, other than a radio frequency identification (RFID) tag, associated with the person of interest and corresponding to the entrance;
  determining whether the individual is a person of interest based on one or more of the image or the device identification;
  determining a confidence score corresponding to the person of interest in response to determining the individual is the person of interest; and
  transmitting a notification of the person of interest to a device in response to the confidence score exceeding a confidence threshold.

13. The method of claim 12, wherein the individual is determined to be the person of interest in response to one or more features of the image corresponding to a person of interest feature set or the device identification corresponding to a person of interest identification set.

14. The method of claim 12, wherein the confidence score is a weighted score corresponding to previous security events.

15. A non-transitory computer-readable medium storing computer executable instructions for identifying a person of interest by a security system, comprising instructions to:
  determine a security event has occurred;
  obtain, from a camera, an image corresponding to the security event;
  generate a first score corresponding to a person of interest based on whether an individual is detected in the image;
  obtain, from a wireless device identification determiner, a device identification of a wireless device, other than a radio frequency identification (RFID) tag, associated with the person of interest and corresponding to the security event;
  generate a second score corresponding to the person of interest based on the obtained device identification;

generate a confidence score corresponding to the person of interest based on the first score and the second score; and store the confidence score in correlation with person of interest information in a database.

16. The non-transitory computer-readable medium of claim 15, further comprising instructions to:

weight the first score or the second score according to a weighted score.

17. The non-transitory computer-readable medium of claim 15, wherein the individual is detected in the image based on facial recognition.

18. The non-transitory computer-readable medium of claim 17, wherein the person of interest information includes one or more of the image or the device identification of the person of interest.

19. A non-transitory computer-readable medium storing computer executable instructions for identifying a person of interest by a security system, comprising instructions to:

obtain, from a camera, an image corresponding to an entrance of an individual;

obtain, from a wireless device identification determiner, a device identification of a wireless device, other than a radio frequency identification (RFID) tag, associated with the person of interest and corresponding to the entrance;

determine whether the individual is a person of interest based on one or more of the image or the device identification;

determine a confidence score corresponding to the person of interest in response to determining the individual is the person of interest; and transmit a notification of the person of interest to a device in response to the confidence score exceeding a confidence threshold.

20. The non-transitory computer-readable medium of claim 19, wherein the individual is determined to be the person of interest in response to one or more features of the image corresponding to a person of interest feature set or the device identification corresponding to a person of interest identification set.

* * * * *